United States Patent
Panuganti (10) Patent No.: US 11,366,914 B2
(45) Date of Patent: Jun. 21, 2022

(54) AUTHENTICATING ACCESS OF SERVICE OF SERVICE ENTITY TO APPLICATION OF CLIENT DEVICE BASED ON WHETHER ROOT CERTIFICATE CORRESPONDING TO APPLICATION IS INSTALLED IN SERVICE ENTITY

(71) Applicant: Hewlett-Packard Development Company, L.P., Spring, TX (US)

(72) Inventor: Surender Panuganti, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 312 days.

(21) Appl. No.: 16/498,984

(22) PCT Filed: Feb. 14, 2018

(86) PCT No.: PCT/US2018/018197
§ 371 (c)(1),
(2) Date: Sep. 27, 2019

(87) PCT Pub. No.: WO2019/160545
PCT Pub. Date: Aug. 22, 2019

(65) Prior Publication Data
US 2021/0089666 A1    Mar. 25, 2021

(30) Foreign Application Priority Data
Apr. 14, 2017    (IN) .......................... IN201741013410

(51) Int. Cl.
*G06F 21/60* (2013.01)
*H04W 36/00* (2009.01)
*H04L 9/40* (2022.01)

(52) U.S. Cl.
CPC ........ *G06F 21/608* (2013.01); *H04L 63/0823* (2013.01); *H04L 63/166* (2013.01); *H04W 36/0005* (2013.01)

(58) Field of Classification Search
CPC ..................................................... G06F 21/608
(Continued)

(56) References Cited

U.S. PATENT DOCUMENTS

| 6,862,583 B1 | 3/2005 | Mazzagatte et al. |
| 8,670,752 B2 | 3/2014 | Fan et al. |

(Continued)

FOREIGN PATENT DOCUMENTS

WO    WO-2009046336    4/2009

OTHER PUBLICATIONS

McDonald et al—Internet Printing Protocol (IPP) over HTTPS Transport Binding and the 'ipps' URI Scheme, Mar. 2015, <https://tools.ietf.org/pdf/rfc7472.pdf> ~ 19 pages.

*Primary Examiner* — Jacky X Zheng
(74) *Attorney, Agent, or Firm* — HP Inc. Patent Department (57) ABSTRACT

Examples for authenticating applications to allow access to a service being offered by a service entity, are described. In one example, a request from an application for accessing services is received over a handshake session adhering to a security protocol. It is determined whether a root certificate corresponding to the application is installed in the service entity. Based on the determination, the request is authenticated to allow access to the services. The authenticating is performed in the handshake session.

15 Claims, 7 Drawing Sheets

(58) Field of Classification Search
USPC .................................................... 358/1.14
See application file for complete search history.

(56) References Cited

U.S. PATENT DOCUMENTS

| | | | |
|---|---|---|---|
| 8,854,650 B2 | 10/2014 | Kishimoto | |
| 9,230,125 B2 | 1/2016 | Inoue | |
| 9,270,674 B2 | 2/2016 | Lang et al. | |
| 2002/0016964 A1* | 2/2002 | Aratani | H04N 7/163 |
| | | | 725/39 |
| 2006/0063534 A1 | 3/2006 | Kokkonen et al. | |
| 2007/0174629 A1 | 7/2007 | Suominen | |
| 2010/0056106 A1* | 3/2010 | Korhonen | H04W 12/0431 |
| | | | 455/411 |
| 2013/0061041 A1* | 3/2013 | Inoue | G06F 21/44 |
| | | | 713/156 |
| 2014/0244998 A1 | 8/2014 | Amenedo | |
| 2015/0365400 A1 | 12/2015 | Cox | |
| 2017/0019381 A1* | 1/2017 | Khazan | H04L 63/166 |
| 2017/0134424 A1* | 5/2017 | Egorov | H04L 67/1002 |

\* cited by examiner

AUTHENTICATING ACCESS OF SERVICE OF SERVICE ENTITY TO APPLICATION OF CLIENT DEVICE BASED ON WHETHER ROOT CERTIFICATE CORRESPONDING TO APPLICATION IS INSTALLED IN SERVICE ENTITY

BACKGROUND

Generally, a computing device may be installed with one or more applications. Such applications may be used for performing a variety of functions. While using such computing devices, the applications may utilize services being offered by other devices, which are referred to as service entities. Examples of such a service entity includes, but is not limited to, a print device which provides printing as a service. In certain cases, not all applications may be permitted or authorized for availing the services being offered by the service entity. Various mechanisms may be implemented for controlling which applications are permitted and which are not permitted from using such services.

BRIEF DESCRIPTION OF THE DRAWINGS

The following detailed description references the drawings, wherein.

DETAILED DESCRIPTION

Any client computing device may be installed with one or more applications. Within a computing network, such applications may seek to utilize services by connecting with an appropriate service entity. At present, owing to rapid increase of mobile devices, such as smartphones, and tablets, there has also been a rapid increase in the number of applications which may be regularly used by users, of which some may attempt to access and avail the services being offered by a service entity. A service entity refers to any device offering a service. An example of such a service entity includes, but is not limited to, a print device with the service being a print service.

For client computing devices (also referred to as client devices) which are present within an organization, the access of services by applications may be controlled. For example, a network administrator may allow or whitelist selected applications installed on a client device. Such whitelisted applications may be permitted to access and avail services from a service entity, for example, print services from print devices. In this manner, the whitelisted or permitted applications may access the service offered by the service entity to the exclusion of other applications, which would be unable to access such services.

A variety of approaches are generally utilized for allowing such applications to access and avail the services offered by the service entity. For instance, to authenticate any application, a message from the application may have to hashed and digitally signed for accessing the resource. The message may then be verified at the service entity based on the digital signature to permit the application to use the service. As would be generally known, before such a message exchange is affected, a handshake session is implemented. During such a handshake session all information required by the client device and the service entity to eventually exchange application data is shared.

In addition to authentication performed during a handshake session, other exchanges for negotiating on techniques to be used for signing the messages may have to be still performed, since the client device and the resource may not always use the same techniques for signing such messages. These approaches may involve multiple hashing and digital signature generations and corresponding communication exchanges. Such mechanisms for permitting applications to access services are often complex, may involve multiple steps, are resource intensive, and cumbersome.

Approaches to authenticate applications installed on a client device to allow access to a service being offered by a service entity, are described. Such authentication is implemented during a handshake session corresponding to a security protocol. In one example, the application may be authenticated based on a root certificate issued by a certifying authority.

The approaches as described may involve an initial registration phase. During registration, an application developer, at the time of developing an application may create a private-public key pair. For registering the application, the public key may be submitted to a registering authority. In one example, the registration involves creating a self-signed root certificate for the application being developed. The root certificate may specify an application identifier, uniquely identifying an application. Once the root certificate is generated, a client certificate for the public key is issued. The client certificate is further signed by the root certificate created for the application being developed. At this stage, the application may be considered as registered. Once the application is ready for distribution, the application may be uploaded onto an application repository along with the client certificate and the root certificate. A user intending to install the application, may download the same from the application repository. Therefore, the client certificate is available with the client device, when the application is installed thereupon. In one example, the application repository may be an application store for distributing the application to one or more user.

At later stages, it may be the case that an administrator may intend to control applications that may utilize services of a service entity. To this end, the administrator may obtain the root certificate corresponding to an application which is to be controlled. The root certificate may be subsequently retrieved from the application repository and imported into the service entity. At the same time, a setting pertaining to client authentication may be enabled at the service entity.

In operation, an application installed on a client device, may request for a service from a service entity over a handshake session which adheres to a security protocol. A handshake session may be considered as a session during which exchange of information required by the client device and the service entity to eventually exchange application data occurs. In one example, the security protocol may include one of Transport Layer Security (TLS) and Secure Sockets Layer (SSL), and the session may be a TLS or SSL handshake session.

In the present example, since the client authentication is enabled at the service entity, the service entity may request a client certificate, which is available along with the installed application on the client device. As would be understood, the client certificate had been initially signed by the root certificate created for the application which is to be authenticated. The service entity on receiving the client certificate may obtain the information pertaining to the root certificate. The service entity may then determine whether the corresponding root certificate is installed therein. If the root certificate of the present application is available on the service entity, the service request is processed and allowed. If the root certificate is not available on the service entity, the service request is denied and a corresponding indication may be communicated to the user.

As would be understood, the process for authenticating the application which may be permitted to avail and access the service is performed during the handshake session (such as the TLS handshake session). Therefore, any additional handshake sessions or authentication at application layer may not be performed. Moreover, any security vulnerability reported in future may be fixed as part of the security protocol update, and no modification may be required at application level.

Figure 1:
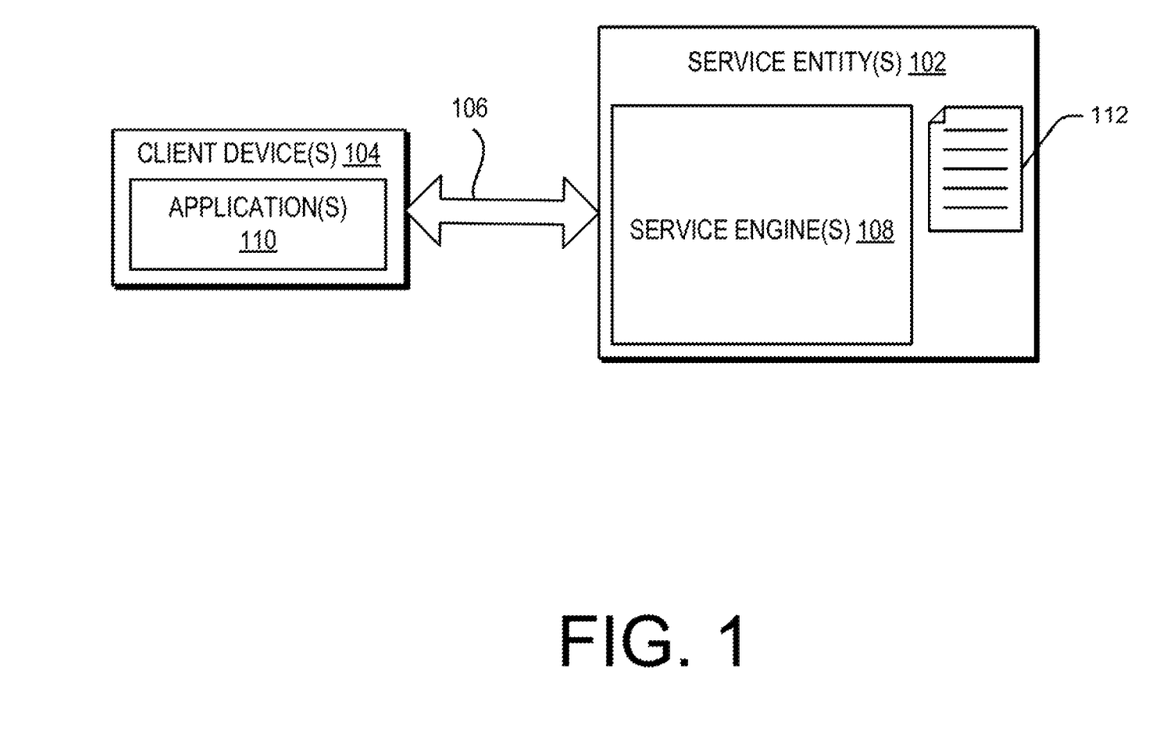
FIG. 1 is a diagram of an example service entity to authenticate applications to allow access to a service being offered.

These and other aspects are described in conjunction with FIGS. 1-7. FIG. 1 illustrates an example service entity 102 for authenticating applications to allow access to a service being offered by it. The service entity 102 may be considered as any processor enable device which performs one or more functions (i.e., services) in response to requests from one or more applications that may be installed on client device(s) 104. An example of such a service entity 102 may include a print device. Such a print device may provide a service involving printing content on a print media in response to one or more requests or commands from client device(s) 104. The service entity 102 and client device(s) 104 may be in communication with each other through a computing network 106. The client device(s) 104 may further include application(s) 110 installed therein. The application(s) 110 may communicate with the service entity 102 for availing services being rendered by the service entity 102.

Continuing with the present example, the service entity 102 may further include service engine(s) 108. The service engine(s) 108 authenticates application(s) 110 to allow access to a service being offered by the service entity 102. As would be explained in the foregoing description, only requests from application(s) 110 which have been authenticated, may be processed. As a result of the authentication, only few or all the application(s) 110 installed on the client devices to avail and access the services being offered by the service entity 102. In one example, the authentication is based on a root certificate 112 which is installed within the service entity 102.

Users of client device(s) 104 may, through application(s) 110 installed on the client device(s) 104, request for a service from the service entity 102. To initiate communication between the service entity 102 and the client device(s) 104, a handshake session may be implemented. Such a handshake session may adhere to a security protocol, such as Transport Layer Security (TLS) and Secure Sockets Layer (SSL). During such a handshake session, information required by the service entity 102 and the client device(s) 104 to eventually engage with each other and exchange application data, occurs. In one example, the security protocol may include one of Transport Layer Security (TLS) and Secure Sockets Layer (SSL), and the session may be a TLS/SSL handshake session.

In operation, the service entity 102 may receive a request from application(s) 110 installed on the client device(s) 104. In the present example, the service engine(s) 108 may process the request during the handshake session and determine whether a corresponding root certificate 112 is installed on the service entity 102. If the service engine(s) 108 determines that the root certificate 112 is installed an the service entity 102, the request is allowed, and the service entity 102 provides the service in response to such request. Conversely, if the service engine(s) 108 determines that a corresponding root certificate 112 is not present in the service entity 102, the request for availing and accessing the service is denied. Accordingly, an appropriate indication may be provided to the user of the client device(s) 104. It should be noted that the authentication of the application(s) 110 is carried out during the handshake session at a security protocol layer. Consequently, no changes may be made at the underlying application layer or in the applications themselves. Furthermore, no additional authentications may be implemented over and above the handshake session.

Figure 2:
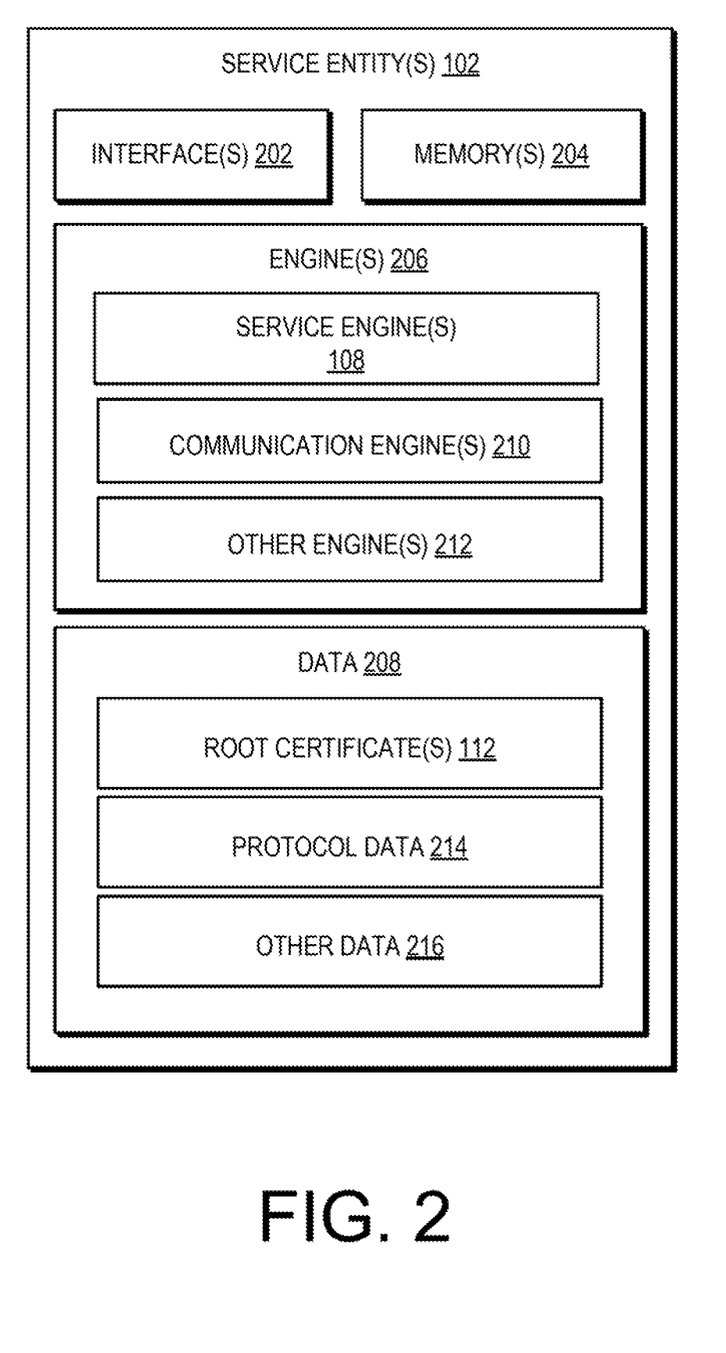
FIG. 2 is a diagram of another example service entity to authenticate applications to allow access to a service being offered.

FIG. 2 illustrates an example service entity 102 to authenticate applications to allow access to a service being offered by the service entity 102. The service entity 102 may be implemented as a standalone computing system or a device communicatively connected through a network to other devices. The service entity 102 includes interface(s) 202 and memory 204. The interface(s) 202 may include a variety of interfaces, for example, interfaces for data input and output devices, referred to as I/O devices, storage devices, network devices, and the like. The interfaces) 202 facilitate communication between the service entity 102 and various computing devices connected in a networked environment. In one example, the interface(s) 202 may provide an interface for communication between the service entity 102 and the client device(s) 104 (as depicted in FIG. 1).

The memory 204 may store one or more computer-readable instructions, which may be fetched and executed to authenticate applications to allow access to a service being offered by a service entity. The memory 204 may include any non-transitory computer-readable medium including, for example, volatile memory such as RAM, or non-volatile memory such as EPROM, flash memory, and the like. The service entity 102 further includes engine(s) 206 and data 208.

The engine(s) 206 may be implemented as a combination of hardware and programming (for example, programmable instructions) to implement one or more functionalities of the engine(s) 206. In examples described herein, such combinations of hardware and programming may be implemented in several different ways. For example, the programming for the engine(s) 206 may be processor executable instructions stored on a non-transitory machine-readable storage medium and the hardware for the engine(s) 206 may include a processing resource (for example, one or more processors), to execute such instructions. In the present examples, the machine-readable storage medium may store instructions that, when executed by the processing resource, implement engine(s) 206. In such examples, the service entity 102 may include the machine-readable storage medium storing the instructions and the processing resource to execute the instructions, or the machine-readable storage medium may be separate but accessible to service entity 102 and the processing resource. In other examples, engine(s) 206 may be implemented by electronic circuitry.

The data 208 includes data that is either stored or generated as a result of the functionalities implemented by any of the engine(s) 206. In an example, the engine(s) 206 include the service engine(s) 108, communication engine(s) 210 and other engine(s) 212. The other engine(s) 212 may implement functionalities that supplement applications or functions performed by the service entity 102 or engine(s) 206. Further, the data 208 may include root certificate(s) 112, protocol data 214, and other data 216. The functioning of the service entity 102 is further described in conjunctions with FIGS. 3-4 which illustrate various steps preceding the authentication of applications to allow access to the services being offered by the service entity 102. For example, FIG. 3 illustrates various steps and entities which may be involved in registering applications for implementing the present subject matter.

Figure 3:
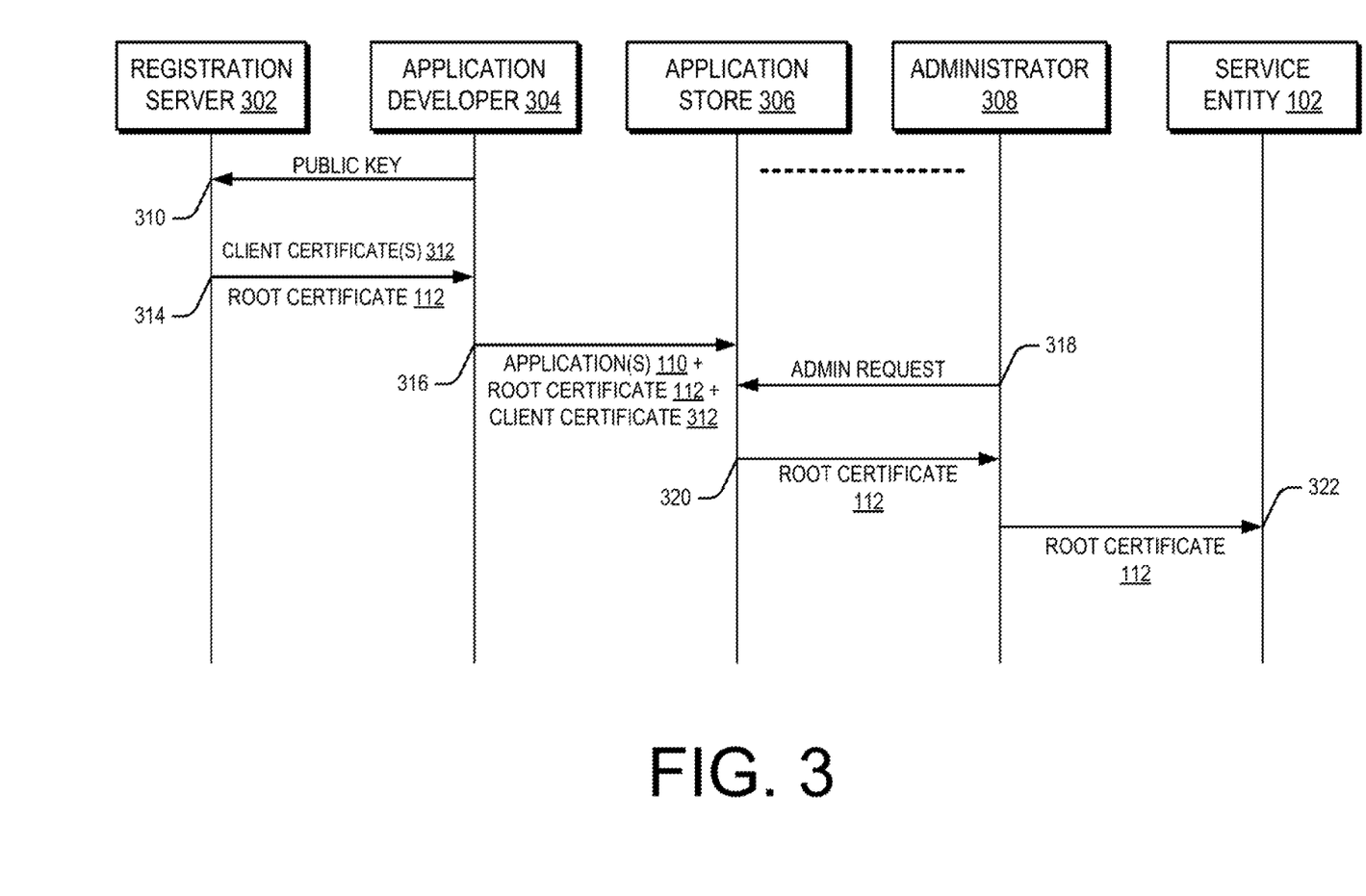
FIG. 3 depicts a flow diagram depicting various stages of application registration to authenticate applications to allow access to a service, as per an example.

FIG. 3 depicts various steps involving a registration server 302, an application developer 304, an application store 306, an administrator 308 and the service entity 102. In one example, an application may be in the process of being developed by an application developer 304. Initially, the application developer 304 may generate a public-private key pair. Thereafter, the application developer 304 may submit the public key to a registration server 302 as part of the registration process (step 310). The registration server 302 on receiving the public key generates a self-signed root certificate for the application being developed. The application may be any one (or more) of the application(s) 110.

Returning to the registration process, the registration server 302 generates a root certificate(s) 112. The root certificate(s) 112 corresponds to the application(s) 110 being developed and may specify an application identifier, uniquely identifying the application(s) 110. In one example, the root certificate(s) 112 may be generated by a certifying authority issuing digital certificates. Once the root certificate(s) 112 is generated, the registration server 302 may further generate a client certificate(s) 312 for the public key that was submitted by the application developer 304 and signed by the root certificate(s) 112. The root certificate(s) 112 and the client certificate(s) 312 are communicated to the application developer 304 (step 314). The application developer 304 may proceed and develop the application(s) 110 using the client certificate(s) 312. The application(s) 110 once developed may be communicated and uploaded onto the application store 308 along with the root certificate(s) 112 and the client certificate(s) 312 (step 316). The application store 306 may be considered as a digital repository for storing machine-readable and executable files, and data corresponding to one or more application(s) 110. The application store 306 may be accessible through a communication network (not shown in FIG. 3). In an example, any user may access the application store 306 to download the desired application(s) 110. In the present example, the application(s) 110 is accompanied with the client certificate(s) 312.

At a later instance, an administrator 308 may wish to restrict and control applications which may avail and access services being provided by the service entity 102 (step 318). To this end, the administrator 308 may request the application store 306 to provide the root certificate(s) 112 for the application which is to be controlled. The request communicated to the application store 306 may specify the name or any other identifier of the application which is to be controlled. In response to the request, the administrator 308 receives the root certificate(s) 112 (step 320). The root certificate(s) 112 obtained by the administrator 308 is subsequently imported or installed into the service entity 102 (step 322). In one example, while the root certificate(s) 112 is being installed in the service entity 102, the administrator 308 may enable client authentication. The client authentication may allow the service entity 102 to authenticate the client device(s) 104 in case any request for availing the services is received, as per the applicable security protocol.

Figure 4:
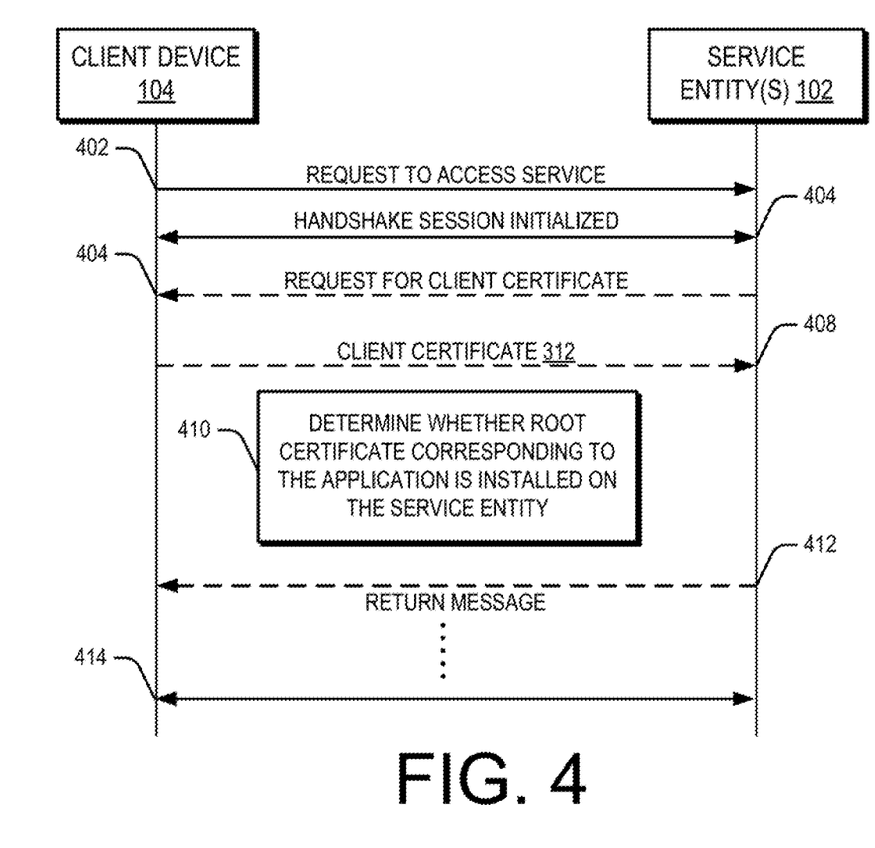
FIG. 4 depicts a flow diagram depicting communication between a client device and a service entity to authenticate applications to allow access to a service being offered by a service entity, as per an example.

The manner in which the applications, such as application(s) 110 may be controlled is described in conjunction with FIG. 4. FIG. 4 depicts interactions between the service entity 102 and the client device(s) 104. In continuation to the example as described in conjunction with FIG. 3, the service entity 102 is installed with the root certificate(s) 112. In operation, the service engine(s) 108 of the service entity 102 may be monitoring for incoming requests for accessing and availing service which are being offered. The client device(s) 104 may send a request for accessing and availing the service being provided by the service entity 102 (step 402). In one example, the communication engine(s) 210 of the service entity 102 initiates a handshake session with the client device(s) 104 (step 404). In operation, an application installed on a client device may request for a service from a service entity over a handshake session which adheres to a security protocol. A handshake session may be considered as a session during which exchange of information utilized by the client device(s) 104 and the service entity 102 to eventually exchange application date occurs. In one example, the security protocol may be one of Transport Layer Security (TLS) and Secure Sockets Layer (SSL), and the session may be a TLS/SSL handshake session. In FIG. 4 the communication and exchanges between the service entity 102 and the client device(s) 104, are depicted in dotted line for sake of illustration. The handshake session may be initiated based on information stored in protocol data 214.

Continuing with the ongoing example, once the handshake session has been initialized, the service entity 102 may request the client device(s) 104 for client certificate(s) 312 (step 406). As discussed previously, the client certificate(s) 312 is signed by the root certificate(s) 112. The client certificate(s) 312 is received by the service entity 102 and processed by the service engine(s) 108 (step 408). The service engine(s) 108 on processing the client certificate(s) 312 determines information pertaining to the root certificate(s) 112 which may have been used to sign. Once such information pertaining to the root certificate(s) 112 is determined, the service engine(s) 108 may further determine whether a corresponding root certificate(s) 112 is installed within the service entity 102 (block 410).

The service engine(s) 108 may compare the information gathered from the client certificate(s) 312 to information indicating whether any root certificate is installed within the service entity 102. On determining that a corresponding root certificate(s) 112 is installed within the service entity 102, the service engine(s) 108 may process the service request received from the client device(s) 104, and allow the client device(s) 104 to access and avail the service being offered. If, however, the service engine(s) 108 determines that no corresponding root certificate(s) 112 is present in the service entity 102, the request for accessing and availing the requested is service is not processed, and hence, denied (step 412). Once the application(s) 110 is authenticated further communication may be accordingly affected. It should be noted that the authentication of the application(s) 110 for availing and accessing the services being offered by the service entity 102, is implemented during the handshake session. In one example, the handshake session may be carried out over the TLS security protocol, which in turn may be implemented in a session layer of the Open Systems Interconnection model (OSI model). The present examples may have been described with respect to an application(s) 110 and a client device(s) 104. However, the above described approaches would also be applicable for a combination of application(s) 110 and client device(s) 104.

The present approaches may also be implemented to subsequently control one or more application(s) 110 which were previously authenticated, from accessing and availing services being offered by the service entity 102. For example, the administrator 308 may, at a later stage, delete root certificate(s) 112 installed within the service entity 102. In such a case, subsequent request for services would not be processed owing to the absence of the root certificate(s) 112.

Figure 5:
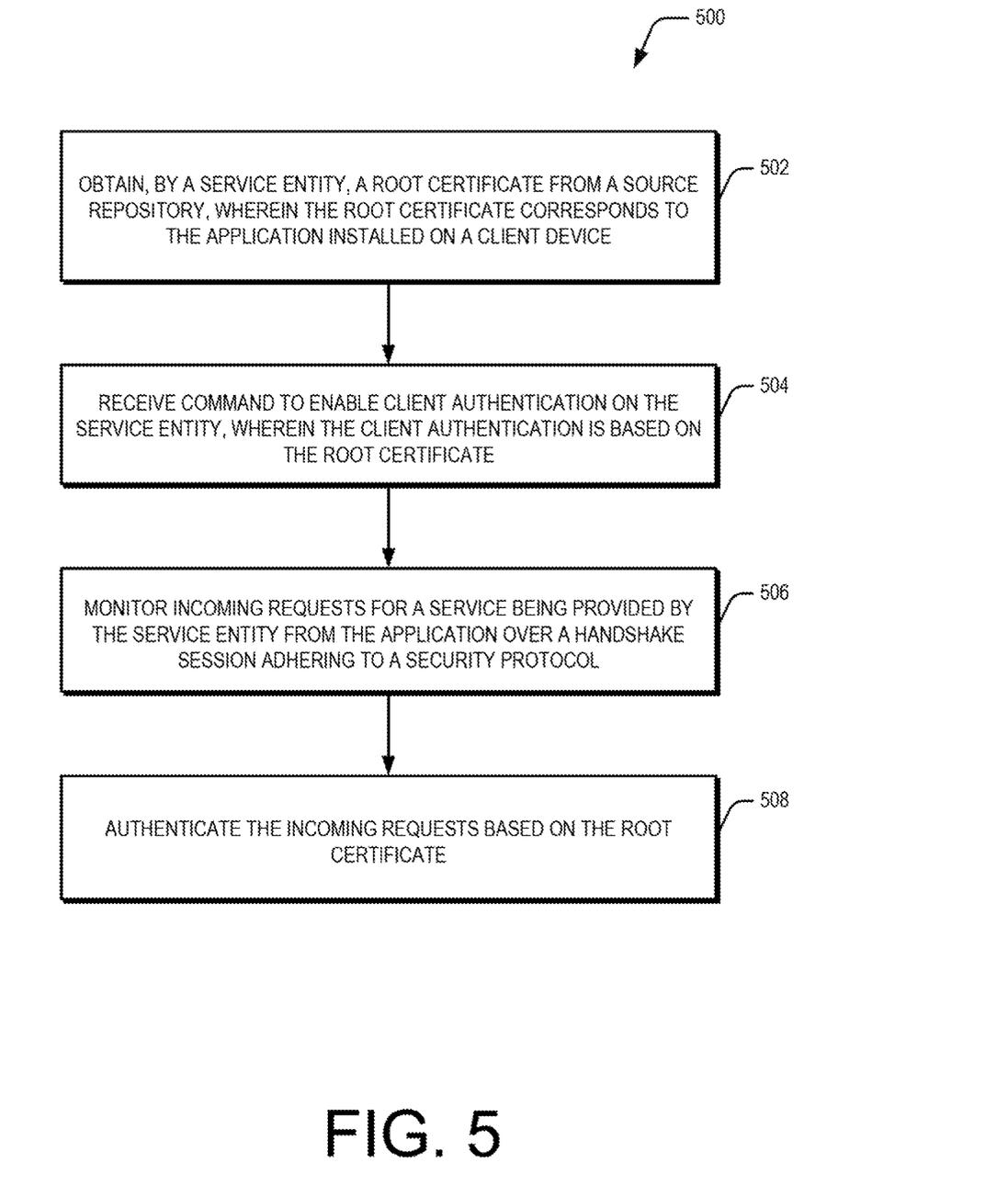
FIG. 5 depicts an example method for authenticating applications to allow access to a service being offered by a service entity.
Figure 6:
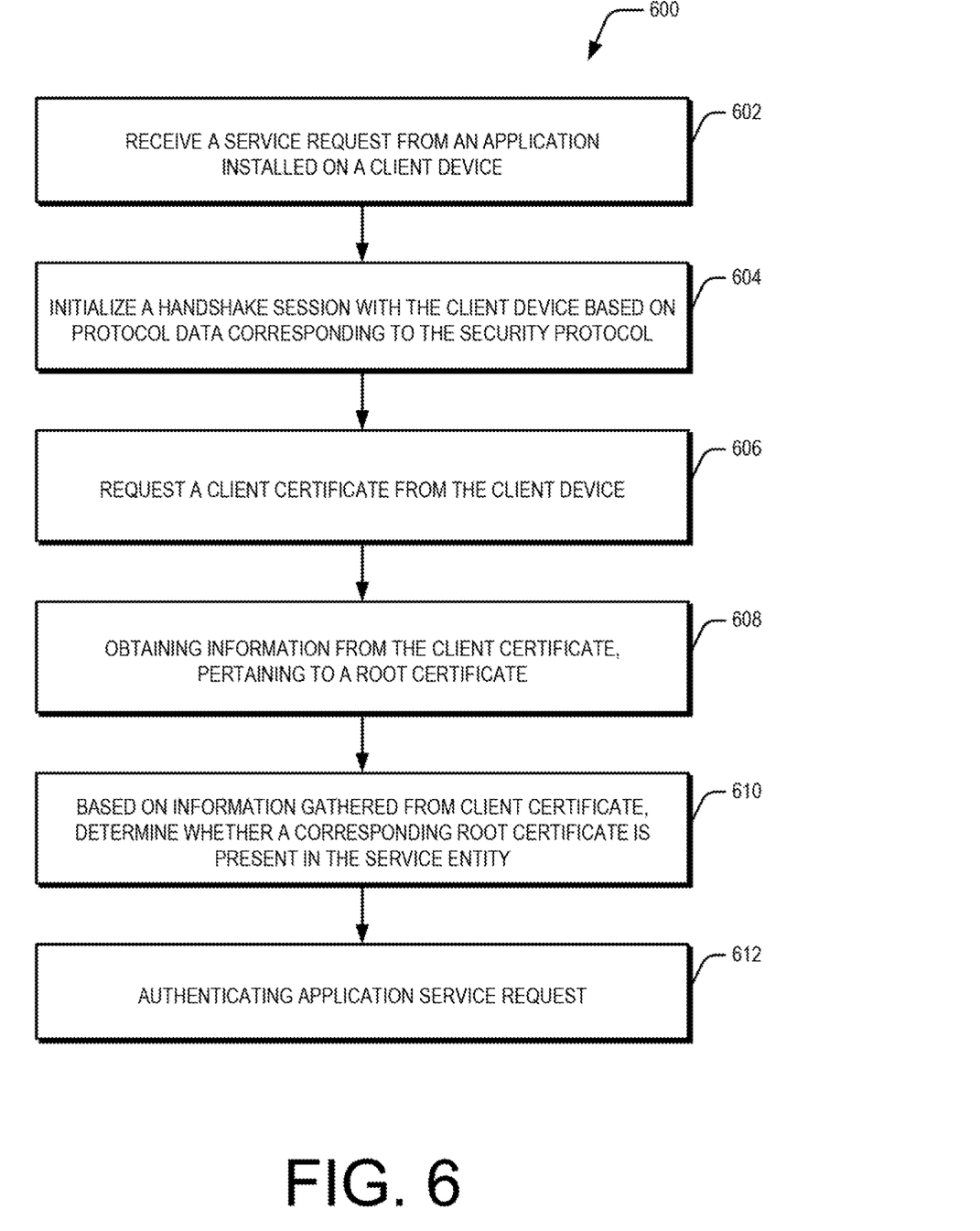
FIG. 6 depicts another example method for authenticating applications to allow access to a service being offered by a service entity.

FIGS. 5-6 illustrate example methods 500 and 600, respectively, for authenticating applications to allow access to a service being offered by a service entity. The order in which the methods are described is not intended to be construed as a limitation, and any number of the described method blocks may be combined in any order to implement the methods, or an alternative method. Furthermore, methods 500 and 600 may be implemented by processing resource or computing device(s) through any suitable hardware, non-transitory machine readable instructions, or combination thereof.

It may also be understood that methods 500 and 600 may be performed by programmed computing devices, such as service entity 102 as depicted in FIGS. 1-4. Furthermore, the methods 500 and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 500 and 600 are described below with reference to service entity 102 as described above; other suitable systems for the execution of these methods may also be utilized. Additionally, implementation of these methods is not limited to such examples.

Returning to FIG. 5, at block 502 by a service entity obtains a root certificate from a source repository. The application is to request a service being provided by the service entity. The root certificate corresponds to the application installed on a client device. For example the service entity 102 may be installed with root certificate(s) 112 corresponding to a certain application(s) 110. The root certificate(s) 112 may have been installed either manually or may have been configured automatically. In one example, the root certificate(s) 112 corresponds to the application(s) 110 being developed and may specify an application identifier, uniquely identifying the application(s) 110.

At block 504, a command to enable client authentication on the service entity may be received. It should be noted that the client authentication is based on the root certificate. For example, the service entity 102 may be configured by an administrator, such as the administrator 308, and is subsequently imported or installed into the service entity 102.

At block 506, incoming requests from the application over a handshake session adhering to a security protocol, are monitored. For example, the service engine(s) 108 of the service entity 102 may be monitoring for incoming requests for accessing and availing service which are being offered.

The client device(s) 104 may send a request for accessing and availing the service being provided by the service entity 102.

At block 508, the incoming request is authenticated based on the root certificate. For example, the communication engine(s) 210 of the service entity 102 initiates a handshake session with the client device(s) 104. In the present example, the service engine(s) 108 may process the request during the handshake session and determine whether a corresponding root certificate 112 in installed on the service entity 102. If the service engine(s) 108 determines that the root certificate 112 is installed on the service entity 102, the request is allowed, and the service entity 102 provides the service in response to such request. Conversely, if the service engine(s) 108 determines that a corresponding root certificate 112 is not present in the service entity 102, the request for availing and accessing the service is denied.

FIG. 6 provides another example method for metering storage usage within a storage volume. At block 602, a service request from an application installed on a Client device is received by a service entity. For example, application(s) 110 installed on client device(s) 104 on intending to avail services from the service entity 102, may communicate a request to the service entity 102. A service entity 102 may be any device which is configured to provide services, such as a print service, in response to commands or requests from application(s) 110 installed on client device(s) 104. An example of such a client device(s) 104 includes, but is not limited to, a handheld device like mobile phone.

At block 604, a handshake session with the client device based on protocol data corresponding to the security protocol being implemented, is initialized. For example, the communication engine(s) 210 of the service entity 102 initiates a handshake session with the client device(s) 104 based on protocol data 214. The handshake session in turn may adhere to a security protocol. A handshake session may be considered as a session during which exchange of information utilized by the client device(s) 104 and the service entity 102 to eventually exchange application data occurs. In one example, the security protocol may be one of Transport Layer Security (TLS) and Secure Sockets Layer (SSL), and the session may be a TLS/SSL handshake session.

At block 606, a client certificate from the client device is requested during the handshake session. For example, the service engine(s) 108 within the service entity 102 may request the client device(s) 104 for client certificate(s) 312. The client certificate(s) 312 as discussed previously, is signed by the root certificate(s) 112.

At block 608, information from the client certificate pertaining to a root certificate is obtained. For example, the service engine(s) 108 may process the client certificate(s) 312 received from the client device(s) 104. The client certificate(s) 312 is such that it had been signed using the root certificate(s) 112 at the time of registering any application, such as application(s) 110. The information indicating the root certificate(s) 112 which has signed the client certificate(s) 312 is determined.

At block 610, based on information gathered from client certificate, it is determined whether a corresponding root certificate is present in the service entity. For example, the service engine(s) 108 may further determine whether a corresponding root certificate(s) 112 is installed within the service entity 102. In one example, the information pertaining to the root certificate(s) 112 installed within the service entity 102 may be available in other data 216.

At block 612, based on information gathered from the client certificate, the service request from the application installed on the client device is authenticated. As a result, the application may utilize the service being offered by the service entity. For example, the service engine(s) 108 may determine whether a root certificate corresponding to the application from which is the service request is received, is present. On determining that the root certificate(s) 112 is present in the service entity 102, the service engine(s) 108 may process the service request and allow the application(s) 110 to avail services from the service entity 102. In case the root certificate(s) 112 is not installed, the service engine(s) 108 may deny the request for availing the service offered by the service entity 102.

Figure 7:
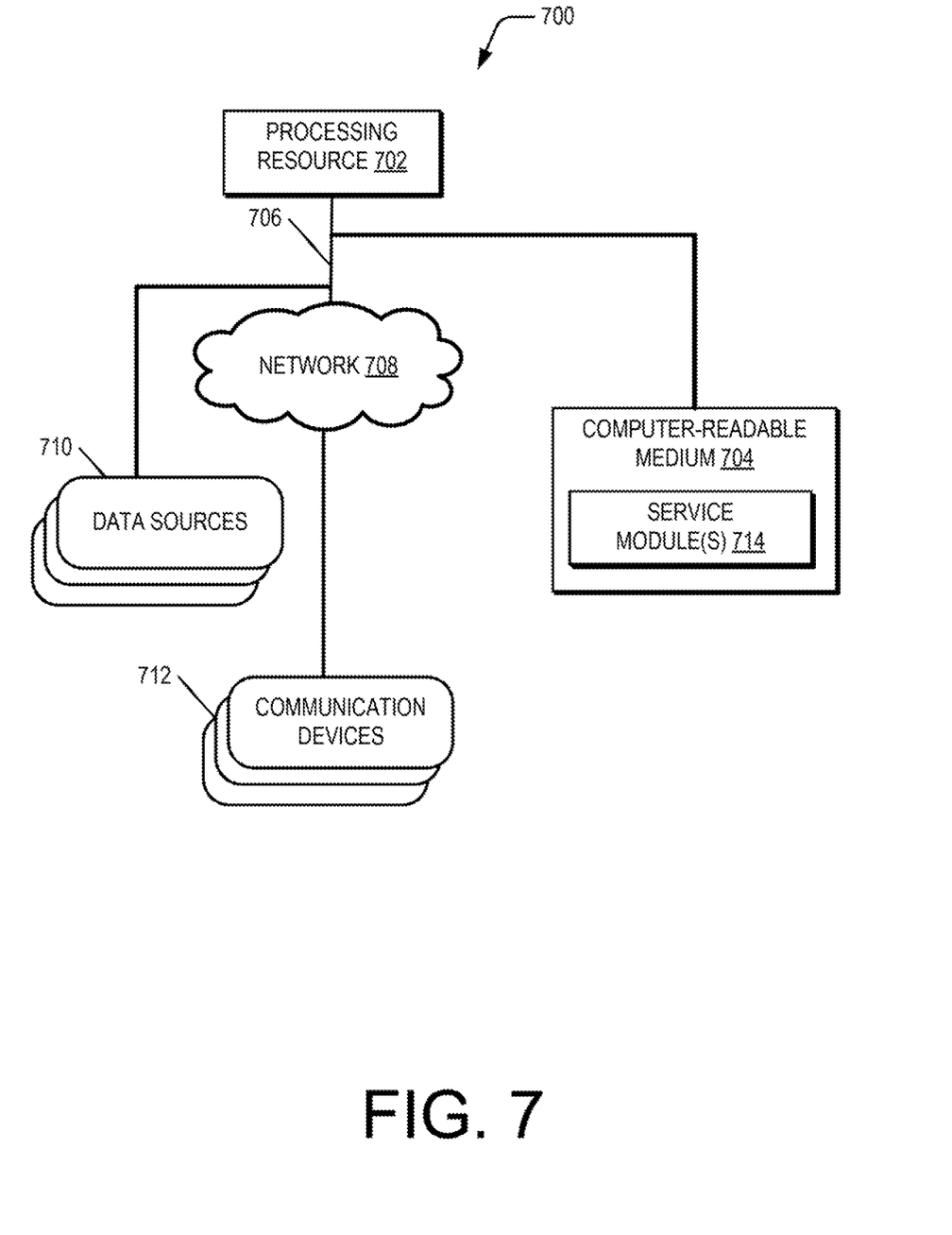
FIG. 7 is a block diagram of an example, system implementing a anon-transitory computer-readable medium to authenticate applications to allow access to a service being offered by a service entity.

FIG. 7 illustrates a system environment 700 to authenticate applications to allow access to a service being offered, according to an example of the present disclosure. The system environment 700 may comprise at least a portion of a public networking environment or a private networking environment, or a combination thereof. In one implementation, the system environment 700 includes a processing resource 702 communicatively coupled to a computer readable medium 704 through a communication link 706.

For example, the processing resource 702 can include one or more processors of a computing device. The computer readable medium 704 may be, for example, an internal memory device of the computing device or an external memory device. In one implementation, the communication link 706 may be a direct communication link, such as any memory read/write interface. In another implementation, the communication link 706 may be an indirect communication link, such as a network interface. In such a case, the processing resource 702 can access the computer readable medium 704 through a network 708. The network 708 may be a single network or a combination of multiple networks and may use a variety of different communication protocols.

The processing resource 702 and the computer readable medium 704 may also be coupled to data sources 710 through the communication link 706, and/or to communication devices 712 over the network 708 The coupling with the data sources 710 enables in receiving the data in an offline environment, and the coupling with the communication devices 712 enables in receiving the data in an online environment.

In one implementation, the computer readable medium 704 includes a set of computer readable instructions, implementing a service module(s) 714. The service module(s) 714 may be implemented within service entity 102. The instructions implementing service module(s) 714 may, in one example, be executable code for authenticating applications to allow access to a service being offered. The set of computer readable instructions within medium 704 may be accessed by the processing resource 702 through the communication link 706 and subsequently executed to process data communicated with the data sources 710 for affecting the approaches s discussed previously.

In one example, a root certificate(s) 112 may be received. The service module(s) 714 may obtain the root certificate(s) 112 thus obtained and import it into the service entity 102. The root certificate(s) 112 is such that it identifies and corresponds to a specific application, such as one of the application(s) 110. The application(s) 110 in turn are those applications installed on client device(s) 104 which may have to be authenticated so that they may avail the services being offered by the service entity(s) 102. The root certificate(s) 112 may subsequently be installed by the service module(s) 714. Once the root certificate(s) 112 is installed, the service module(s) 714 may further enable client authentication on the service entity 102 to be performed in the event of receiving a request for providing service from any of the client device(s) 104.

Thereafter, the service module(s) 714 may monitor incoming requests for services from application(s) 110 installed on the client device(s) 104. In one example, the communication engine(s) 210 of the service module(s) 714 initiates a handshake session with the client device(s) 104. A handshake session may be considered as a session during which exchange of information utilized by the client device(s) 104 and the service entity 102 to eventually exchange application data occurs. In one example, the security protocol may be one of Transport Layer Security (TLS) and Secure Sockets Layer (SSL), and the session may be a TLS/SSL handshake session. Continuing with the ongoing example, once the handshake session has been initialized, the service module(s) 714 may request the client device(s) 104 for client certificate(s) 312 corresponding to the application requesting access to the services. The service module(s) 714 on processing the client certificate(s) 312 determines information pertaining to the root certificate(s) 112 which may have been used to sign. Once such information pertaining to the root certificate(s) 112 is determined, the service module(s) 714 may further determine whether a corresponding root certificate(s) 112 is installed within the service module(s) 714 (block 410).

The service module(s) 714 may compare the information gathered from the client certificate(s) 312 to information indicating whether any root certificate is installed within the service entity 102. On determining that a corresponding root certificate(s) 112 is installed within the service entity 102, the service modules) 714 may process the service request received from the client device(s) 104, and allow the client device(s) 104 to access and avail the service being offered. If, however, the service module(s) 714 determines that no corresponding root certificate(s) 112 is present, the request for accessing and availing the requested service is not processed, and hence, denied. Once the application(s) 110 is authenticated, further communication may be accordingly affected. It should be noted that the authentication of the application(s) 110 for availing and accessing the services being offered by the service module(s) 714, is implemented during the handshake session. In one example, the handshake session may be carried out over the TLS security protocol, which in turn may be implemented in a session layer of the Open Systems Interconnection model (OSI model). The present examples may have been described with respect to an application(s) 110 and a client device(s) 104. However, the above described approaches would also be applicable for a combination of application(s) 110 and client device(s) 104.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

I claim:

1. A service entity comprising:
a service engine to provide a service in response to request from an application installed on a client device, wherein the service engine is to:
receive a request from the application for accessing the service;
determine whether a root certificate corresponding to the application is installed in the service entity; and authenticate the request based on the determining, by:
  providing access of the service to the application on determining that the root certificate is installed in the service entity; and
  denying the access of the service to the application on determining that the root certificate is not installed in the service entity,
wherein the authenticating is performed in a handshake session between the service entity and the client device, with the handshake session adhering to a security protocol.

2. The service entity as claimed in claim 1, wherein the service engine, to determine whether the root certificate is installed, is to:
  request a client certificate from the client device, with the client certificate corresponding to the application, wherein the client certificate is signed by the root certificate;
  retrieve information associated with the root certificate from the client certificate; and
  based on the information, identify whether the root certificate is installed on the service entity.

3. The service entity as claimed in claim 1, wherein the security protocol is one of Transport Layer Security (TLS) and Secure Sockets Layer (SSL).

4. The service entity as claimed in claim 3, wherein the handshake session is a TLS handshake session between the service entity and the client device.

5. The service entity as claimed in claim 1, wherein the root certificate specifies a unique application identifier for the application which may access the service provided by the service entity,
  and wherein the root certificate is generated for the application prior to development of the application being completed.

6. The service entity as claimed in claim 1, wherein the root certificate is uninstallable to subsequently deny the application access to the service.

7. A method comprising:
  obtaining by a service entity, a root certificate from a source repository, wherein the root certificate corresponds to an application installed on a client device;
  receiving command to enable client authentication on the service entity, wherein the client authentication is based on the root certificate;
  monitoring incoming requests for a service being provided by the service entity from the application over a handshake session adhering to a security protocol;
  determining whether the root certificate corresponding to the application is installed within the service entity; and
  authenticating the incoming requests based on the root certificate, by:
    determining whether the root certificate corresponding to the application is installed in the service entity;
    providing access of the service to the application on determining that the root certificate is installed in the service entity; and
    denying the access of the service to the application on determining that the root certificate is not installed in the service entity.

8. The method as claimed in claim 7, wherein the root certificate is a public key certificate to identify a root certificate authority and a unique application identification, and wherein the root certificate is generated for the application prior to development of the application being completed.

9. The method as claimed in claim 7, wherein the method comprises enabling client authentication conforming to the security protocol.

10. The method as claimed in claim 7, wherein determining whether the root certificate is installed comprises:
  requesting a client certificate from the client device, with the client certificate corresponding to the application, wherein the client certificate is signed by the root certificate;
  retrieving information associated with the root certificate from the client certificate; and
  based on the information, identify whether the root certificate is installed on the service entity.

11. The method as claimed in claim 10, the method further comprising:
  uninstalling the root certificate from the service entity;
  monitoring incoming requests from the application to access the service; and
  denying access to the incoming request.

12. The method as claimed in claim 7, wherein the service entity is a print device.

13. A non-transitory computer-readable medium comprising instructions executable by a processing resource to:
  import a root certificate into a service entity providing a service, wherein the root certificate corresponds to the application installed on a client device;
  enable client authentication on the service entity;
  receive a request from the application for accessing the service;
  determine whether the root certificate corresponding to the application is installed within the service entity; and
  authenticate the incoming requests based on the root certificate, by:
    determining whether the root certificate corresponding to the application is installed in the service entity;
    providing access of the service to the application on determining that the root certificate is installed in the service entity; and
    denying the access of the service to the application on determining that the root certificate is not installed in the service entity.

14. The non-transitory computer-readable medium as claimed in claim 13, wherein the instructions are executable by the processing resource to determine whether the root certificate is installed by:
  requesting a client certificate from the client device, with the client certificate corresponding to the application, wherein the client certificate is signed by the root certificate;
  retrieving information associated with the root certificate from the client certificate; and
  based on the information, identify whether the root certificate is installed on the service entity.

15. The non-transitory computer-readable medium as claimed in claim 13, wherein the root certificate is generated for the application prior to development of the application being completed.

* * * * *